United States Patent
Shapiro et al.

(10) Patent No.: US 9,956,815 B2
(45) Date of Patent: May 1, 2018

(54) OVERMOLDED CUTLERY ARTICLES

(71) Applicant: MODERN PACKAGING LLC, Chicago, IL (US)

(72) Inventors: Benjamin Shapiro, Chicago, IL (US); Christopher Wlezien, Chicago, IL (US); Martin Rathgeber, Chicago, IL (US); Matthew Shapiro, Chicago, IL (US)

(73) Assignee: Modern Packaging LLC, Chicago, IL (US)

( * ) Notice: Subject to any disclaimer, the term of this patent is extended or adjusted under 35 U.S.C. 154(b) by 335 days.

(21) Appl. No.: 14/751,964

(22) Filed: Jun. 26, 2015

(65) Prior Publication Data
US 2016/0023504 A1    Jan. 28, 2016

Related U.S. Application Data

(60) Provisional application No. 62/020,125, filed on Jul. 2, 2014.

(51) Int. Cl.
*B25G 1/10*    (2006.01)
*B44C 3/12*    (2006.01)
(Continued)

(52) U.S. Cl.
CPC ............... *B44C 3/12* (2013.01); *A47G 21/02* (2013.01); *A47G 21/04* (2013.01); *B25G 1/00* (2013.01);
(Continued)

(58) Field of Classification Search
CPC .... B25G 1/10; B25G 1/00; B25G 3/34; B26B 3/02; Y10T 16/44; Y10T 16/476
See application file for complete search history.

(56) References Cited

U.S. PATENT DOCUMENTS 2,335,872 A    12/1943  Mitchell
2,680,984 A *  6/1954  Ingwer ................... B25B 13/12
                                                    76/114
(Continued)

FOREIGN PATENT DOCUMENTS

CN    2465885 Y    12/2001
CN    202742712 U    2/2013
(Continued)

OTHER PUBLICATIONS

International Search Report and Written Opinion, Appl. No. PCT/US2015/038027, dated Dec. 14, 2015.
(Continued)

*Primary Examiner* — Victor D Batson
*Assistant Examiner* — Matthew J Sullivan
(74) *Attorney, Agent, or Firm* — Winston & Strawn LLP

(57) ABSTRACT

Overmolded articles of cutlery that include a first molded structure that includes a working end and a longitudinal support core extending away from the working end, the core including top and bottom surfaces and opposed sidewalls located along its length with the sidewalls having a height that extends above the top surface of the core; and a second molded structure present upon the top surface of the core between the sidewalls forming with the support core a handle for the article. Preferably, the first and second molded structures have different colors and the first molded structure includes islands so as to enhance the appearance of the cutlery. Also, methods of making these articles by overmolding the second molded structure over at least a portion of the first molded structure are disclosed.

21 Claims, 12 Drawing Sheets

(51) Int. Cl.

| | | |
|---|---|---|
| *A47G 21/02* | (2006.01) | |
| *A47G 21/04* | (2006.01) | |
| *B26B 3/02* | (2006.01) | |
| *B44C 3/02* | (2006.01) | |
| *B29C 45/16* | (2006.01) | |
| *B29C 45/00* | (2006.01) | |
| *B25G 1/00* | (2006.01) | |
| *B29L 31/28* | (2006.01) | |
| *B29L 31/00* | (2006.01) | |

(52) U.S. Cl.
CPC ............... *B25G 1/10* (2013.01); *B26B 3/02* (2013.01); *B29C 45/00* (2013.01); *B29C 45/0046* (2013.01); *B29C 45/16* (2013.01); *B44C 3/02* (2013.01); *B29C 2045/1687* (2013.01); *B29K 2995/0021* (2013.01); *B29L 2031/286* (2013.01); *B29L 2031/722* (2013.01)

(56) References Cited

U.S. PATENT DOCUMENTS

| | | | |
|---|---|---|---|
| 3,185,001 A * | 5/1965 | Viator | B25G 1/105 |
| | | | 16/430 |
| 4,422,995 A | 12/1983 | Schad | |
| 4,440,820 A | 4/1984 | Shiho et al. | |
| 4,479,630 A | 10/1984 | Wernecke | |
| 4,535,014 A | 8/1985 | Wright | |
| 5,049,343 A | 9/1991 | Sorensen | |
| 5,290,063 A | 3/1994 | Lenhart | |
| D353,050 S | 12/1994 | Moskovich | |
| 5,376,325 A | 12/1994 | Ormson | |
| 5,615,445 A | 4/1997 | Kelsay et al. | |
| 5,721,404 A | 2/1998 | Toedtman | |
| 5,920,943 A | 7/1999 | Barker | |
| 5,956,799 A * | 9/1999 | Panaccione | A47L 13/022 |
| | | | 15/143.1 |
| 6,108,869 A | 8/2000 | Meessmann et al. | |
| 6,117,384 A | 9/2000 | Laurin et al. | |
| D446,426 S | 8/2001 | Riemer | |
| 6,276,020 B1 | 8/2001 | Leversby et al. | |
| 6,368,536 B1 | 4/2002 | Hoepfl et al. | |
| D479,103 S | 9/2003 | McMullin | |
| 6,634,877 B2 | 10/2003 | Sicilia et al. | |
| 6,749,788 B1 | 6/2004 | Holden et al. | |
| 6,821,468 B2 | 11/2004 | Stegmaier | |
| D499,938 S | 12/2004 | McMullin | |
| 6,983,542 B2 | 1/2006 | Mithal et al. | |
| 7,234,939 B2 | 6/2007 | Bills | |
| D555,433 S | 11/2007 | Koennecke | |
| D572,543 S | 7/2008 | Koennecke | |
| 7,487,007 B2 | 2/2009 | MacDonald et al. | |
| 7,526,869 B2 | 5/2009 | Blatter et al. | |
| 7,694,378 B2 | 4/2010 | Tsurukawa et al. | |
| 7,811,497 B2 | 10/2010 | Balint et al. | |
| 8,012,393 B2 | 9/2011 | Hager | |
| 8,012,398 B2 | 9/2011 | Zadesky et al. | |
| 8,032,991 B2 * | 10/2011 | Lawless | B25G 1/105 |
| | | | 16/430 |
| D654,695 S | 2/2012 | Jimenez et al. | |
| 8,153,045 B2 | 4/2012 | Boor | |
| D675,868 S | 2/2013 | Liming et al. | |
| D675,869 S | 2/2013 | Gallop | |
| D675,870 S | 2/2013 | Gallop | |
| D675,871 S | 2/2013 | Gallop | |
| 8,414,813 B2 | 4/2013 | Jung et al. | |
| 8,726,518 B2 | 5/2014 | Bruno | |
| 8,747,100 B2 | 6/2014 | Grimm | |
| 8,993,098 B2 | 3/2015 | Masanek, Jr. et al. | |
| 2002/0014720 A1 | 2/2002 | Sicilia et al. | |
| 2006/0191145 A1 | 8/2006 | Mithal et al. | |
| 2007/0079685 A1 | 4/2007 | Mizek | |
| 2009/0119860 A1 | 5/2009 | Amsel | |
| 2009/0143767 A1 | 6/2009 | Fentress et al. | |
| 2009/0144991 A1 | 6/2009 | Synnestvedt et al. | |
| 2010/0192388 A1 | 8/2010 | Mithal et al. | |
| 2011/0146015 A1 | 6/2011 | Moskovich et al. | |
| 2011/0219631 A1 | 9/2011 | Hou et al. | |
| 2013/0047528 A1 | 2/2013 | Masanek, Jr. et al. | |
| 2013/0174366 A1 | 7/2013 | Stebila et al. | |
| 2016/0039129 A1 * | 2/2016 | Hou | A47G 19/02 |
| | | | 76/104.1 |
| 2017/0120490 A1 * | 5/2017 | Shapiro | B29C 45/16 |

FOREIGN PATENT DOCUMENTS

| | | | | |
|---|---|---|---|---|
| CN | 103568200 A | | 2/2014 | |
| DE | 2334977 A1 * | | 1/1975 | ............... B25G 1/10 |
| DE | 3622596 A1 * | | 1/1987 | ............... B25G 1/10 |
| DE | 10 2004 060 876 A1 | | 6/2006 | |
| FR | 2 622 512 A3 | | 5/1989 | |
| GB | 1 379 930 A | | 1/1975 | |
| GB | 2 274 615 A | | 8/1994 | |
| JP | 2002-361680 A | | 12/2002 | |
| WO | 2010/130949 A1 | | 11/2010 | |

OTHER PUBLICATIONS

Colgate toothbrush with diamond pattern in handle, May 22, 2014.
Colgate Wave Gum Comfort Toothbrush. http://www.colgate.com/en/us/oc/products/toothbrush/colgate-wave-gum-comfort-toothbrush. Retrieved on Oct. 17, 2015.
Toothbrush (2013).
Gillette MACH3® Sensitive Disposable Razor. http://gillette.com/en-us/products/razor-blades/mach3-razors/mach3-sensitive-disposable-razor. Retrieved on Oct. 17, 2015.
Gillette Mach III Razor (2013).
Noxzema Spa Shave 4 Blade Shaver. http://www.bing.com/images/search?q=noxzema+spa+shaver+review&view=detailv2&&id=071C4CFD52C29A79740EA29A75C454ABF69050F4&selectedIndex=0&ccid=eXUGkeTj&simid=607998328547378825&thid=OIP.M79750691e4e3652ef4d2c3c318fdb827o0&ajaxhist=0. Retrieved on Oct. 27, 2015.
Noxzema Spa Shaver (2013).

* cited by examiner

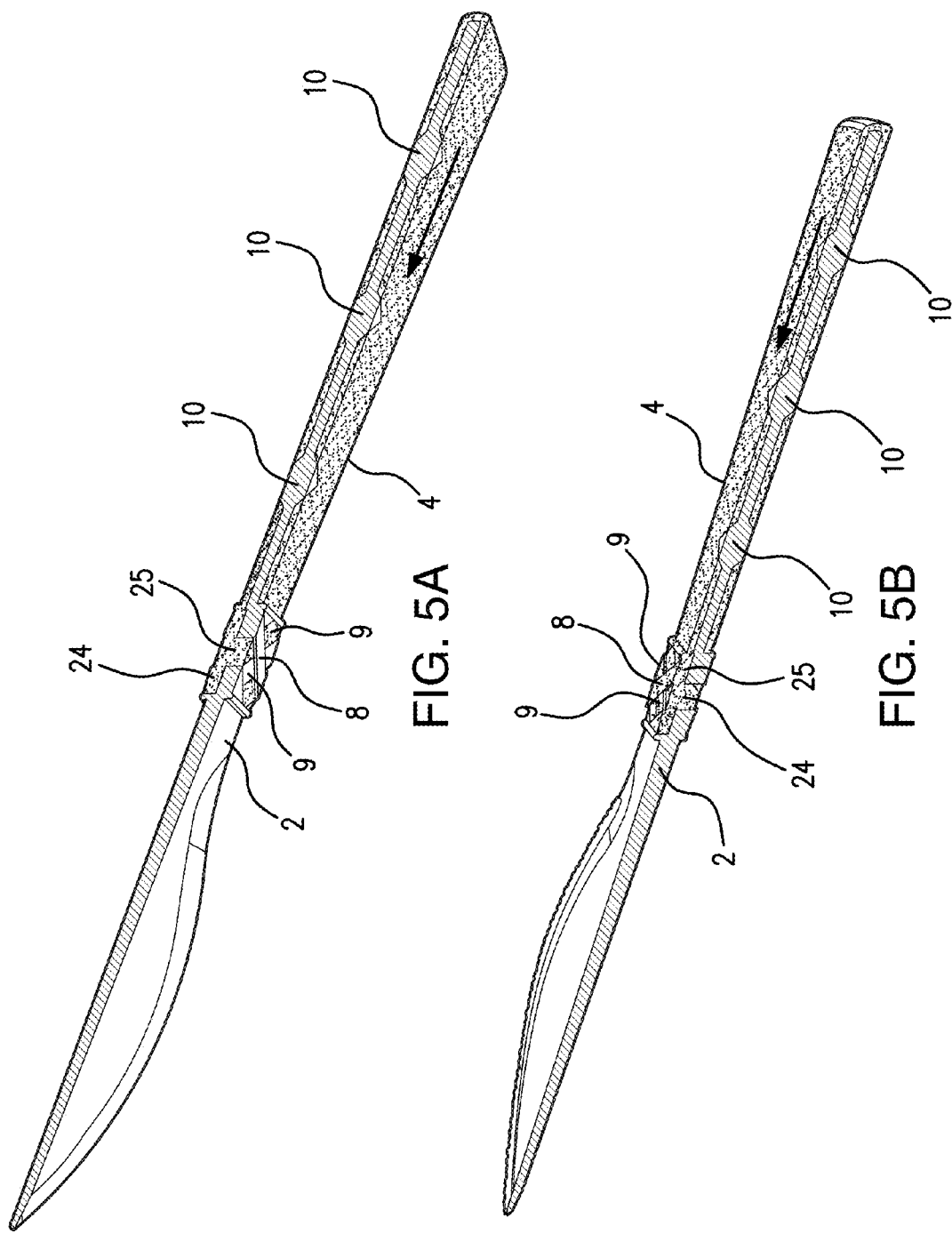

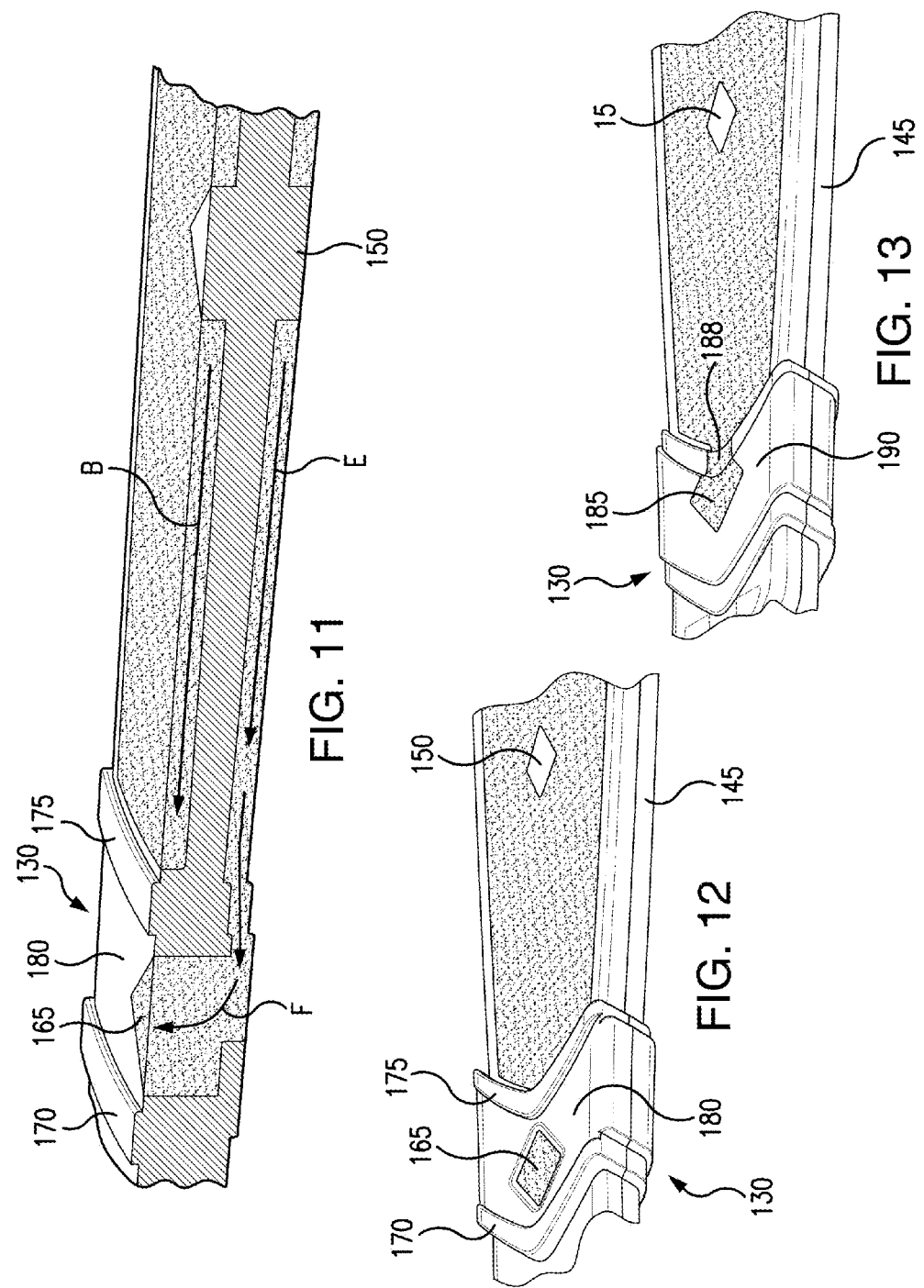

OVERMOLDED CUTLERY ARTICLES

This application claims the benefit of U.S. provisional application No. 62/020,125 filed Jul. 2, 2014, the entire content of which is expressly incorporated herein by reference thereto.

BACKGROUND OF THE INVENTION

1. Field of the Invention

This invention relates to disposable molded articles such as eating utensils and tableware and to the production of expendable eating utensils and tableware for home, restaurant, catering, commercial and institutional use. More particularly, this invention relates to expendable cutlery and tableware with enhanced appearance, lower cost, improved safety and increased structural integrity.

2. Background

Disposable plastic eating utensils, sometimes referred to as disposable cutlery, are used extensively in restaurants, at home, in institutions, in commercial settings such as on airplanes, and for catered events because of the convenience they provide at a cost that is reasonably low to permit disposal after a single use. Currently, there are many types of disposable plastic cutlery ranging from barely functional inexpensive light-weight plastic cutlery to relatively expensive but higher-quality and more attractive cutlery styles.

Disposable cutlery articles are generally regarded as having a less-than-classic appearance which is not suited for an upscale presentation, while permanent cutlery, that is, metal cutlery is generally regarded as more upscale and as having a superior image but is, practically speaking too expensive to be disposable after a single use. This difference in perception is not entirely due to the superior strength of permanent cutlery. Although stainless steel cutlery or permanent cutlery is indeed stronger than disposable plastic cutlery, heavyweight plastic cutlery is functionally adequate for most occasions and may, after washing, even be reused. It is therefore still low enough in cost to be considered non-permanent but, rather, expendable in the sense of reusable for a limited time or a limited number of washings rather than disposable after a single use. Thus a primary obstacle to the use of disposable plastic cutlery in upscale situations is the perception and the image associated with disposable plastic cutlery rather than its actual performance.

One approach to enhancing the appeal of disposable plastic cutlery is to metalizing it. Metalized cutlery is described in U.S. Pat. No. 6,983,542 and US Patent Publications Nos. 2006/0191145 and 2010/0192388. These publications describe metalized plastic cutlery that replicates the appearance of genuine stainless steel cutlery.

Another way to enhance the appearance of disposable plastic items is to mold the articles in different colors or with different textures. A number of other references disclose disposable articles of cutlery or other products including the use of overmolding of different plastic or elastomeric materials to make the article. U.S. Pat. No. 6,634,877 and US Patent Publication No. 2002/0014720 disclose apparatus and methods for the injection overmolding of articles and the entire content of these documents is expressly incorporated herein by reference thereto as examples of the types of equipment and methods that are usable in the present invention along with the modifications disclosed herein.

A number of specific examples of molded articles follow.

U.S. Pat. No. 7,234,939 discloses a dental instrument made by two shot overmolding with polymers having different properties—one rigid and one elastomeric. The surface of the first polymer may be roughened to form an interlock with the second polymer. The dental instrument substrate is metal. An identifying character (618' in FIG. 6B) may be molded of a first polymer and then surrounded by a second polymer of a different color.

U.S. Pat. No. 6,821,468 discloses the molding of two materials to form a handle. Lettering can be provided in one of the materials remote from the other material.

U.S. Pat. No. 6,368,536 discloses a tool handle injection molded of two different materials. Handle 11 is formed in a two-shot injection molding process, the inner body 20 being formed in the first shot and the outer gripping body 35 being formed in the second shot. The outer body completely surrounds the inner body.

U.S. Pat. No. 6,276,020 discloses a toothbrush made by molding a first material for strength and providing a pair of recesses for receiving a second material for aesthetics, wherein the second material in the recesses are separated by the first material.

U.S. Pat. No. 5,956,799 discloses a putty knife made of a first molded material with raised ribs of a second molded material.

U.S. Pat. No. 5,920,943 is directed to a co-injected paint brush having an outer softer layer and inner structure of harder material.

U.S. Pat. No. 5,615,445 discloses a putty knife made of a first molded harder material that is overmolded with a second softer material.

U.S. Pat. No. 5,290,063 discloses a two molded handgrip for a ski pole. The grip includes letters of a different color than the soft elastomeric material that surrounds the letters.

U.S. Pat. No. 4,535,014 discloses a multicolor two (or more) shot process for imparting different colored polymers into the handle of an article such as a toothbrush.

U.S. Pat. No. 4,422,995 discloses a method for injection-molding an elongate hollow workpiece about a central core wherein a first quantity of plastic is injected into a first mold cavity through which part of the core extends, to form a spacer element around the core. After the spacer element has hardened, the core and spacer element are transferred to a second mold cavity where another plastic is injected into the second mold cavity to complete the work-piece.

U.S. Pat. No. 2,335,872 discloses a molded cutlery item formed by placing a blade and molded handle assembly in a two-piece mold, one member of which is indicated at 40 (FIG. 4), the mold having a gate 42 and a vent 43. This mold is preferably of steel or other suitable metal. Metal for uniting the tang and handle is then poured through the gate 42. This metal is preferably an alloy of tin 55-60%, lead 40-45%, with a small quantity of antimony, and having a pouring temperature not in excess of about 400-450° F. The metal flows around the blade and handle, as seen in FIG. 4, flowing down from the bolster into the bore of the handle, filling the bore around the tang and flowing out of the bore through the apertures 28 so as to form rivets 20.

US Patent Publication No. 2011/0219631 discloses plastic cutlery of first and second parts joined together. The first part is a food contacting part of a first food-grade resin, that may be metallized; the second part is a non-food-contacting part of a non-food grade resin that may be pigmented. The first part may be of a first resin that is co-extruded with an antimicrobial-containing outer layer. The food contacting part is inserted into the non-food contacting part.

US Patent Publication No. 2009/0144991 discloses a utensil head that is pivotally connected to a shaft, such that the utensil head articulates between unfolded and folded positions.

US Patent Publication No. 2009/0119860 discloses an article having a riveted joint, in which the components that are joined together are movable with respect to one another in a plane perpendicular to the rivet.

US Patent Publication No. 2007/0079685 discloses a guitar pick that includes a body 40 that has void 45 (e.g. as shown in FIG. 7), which can be a closed bore or a through bore. Body 30 can have boss 36 which can form letters or other indicia, for example as shown in FIGS. 5 and 6, projecting from body 30 and matingly engaged within void 35, such as shown in FIG. 5. Void 45 and boss 36 can have corresponding shapes or different shapes. The boss is surrounded by molding material.

Despite these disclosures, there still remains a growing demand for even more attractive, yet sanitary, disposable articles such as cutlery that can be efficiently and effectively produced, and these are now provided by the present invention.

SUMMARY OF THE INVENTION

The invention now provides improvements over the art in the form of a molded article comprising a first molded structure that includes a working end and a longitudinal support core extending away from the working end, the core including top and bottom surfaces and opposed sidewalls located at least along its length. Advantageously, to facilitate molding of a second molded structure upon the first molded structure, the sidewalls have a height that extends above the top surface of the core or the core further comprises one or more islands having an exposed surface and one or more sides.

Preferably, the molded article includes a second molded structure present at least upon the top surface of the core of the first shot molded structure between the sidewalls to form with the support core a handle for the article. Also, the sidewalls preferably have a height that extends below the bottom surface of the core, wherein the second molded structure is also present upon the bottom surface of the core between the sidewalls.

The support core is generally tapered from a relatively thicker central longitudinal portion to relatively thinner side portions that are connected to the sidewalls, wherein a plurality of islands of the first molded structure are preferably arranged along the central longitudinal portion of core on both the top and bottom surfaces in spaced relation relative to the sidewalls with the islands on the top surface being positioned in vertical alignment with the islands on the bottom surface. The first molded structure preferably has a tapered end opposite the working end, and the second molded structure extends from the top surface to the bottom surface of the core covering the tapered end, with the sidewalls adjacent the tapered end including angled end portions.

In other molded articles, instead of or in addition to the sidewalls, the first molded structure may include one or more islands having an exposed surface and one or more sides, with the islands being positioned in a predetermined alignment with respect to the sidewalls, and wherein the second molded structure covers the side(s) but not the exposed surfaces of the islands. Also, the top and bottom surfaces of the first molded structure may comprise the one or more islands which are positioned in a predetermined alignment with respect to the sidewalls, and wherein the second molded structure covers the side(s) but not the exposed surfaces of the islands. Preferably, the first molded structure includes both the sidewalls and islands to facilitate molding of the second molded structure upon the first molded structure.

The exposed surface of the islands may have a circular, oval, polygonal or diamond perimeter and the side(s) have the same perimeter as the exposed surface or a different perimeter, optionally with the islands collectively forming a pattern or writing. The first molded structure and the second molded structure are preferably of different colors such that the color of the exposed surfaces of the islands contrast with the color of the second molded structure. The color effects are heightened when the islands are provided with angled side(s), in particular when the second shot material is transparent. The islands also may be configured to appear as rivets to enhance the appearance of the article. The islands provide stabilizing support for the first molded structure.

The first molded structure may include a transition structure that is located in between and connected to the working end and core with the transition structure including one or more openings therein, and wherein the second molded structure extends into and fills the one or more openings. This structure provide a visually appealing design to the article while also contributing to the strength connection between the working end and the core. The molded sidewalls of the first molded structure preferably extend from the transition structure and form the periphery of the handle of the article, and a hole is provided in the core or between the core and the sidewall to facilitate formation of the second molded structure. The working end typically includes a tool selected from the group consisting of a spoon, fork, knife, toothbrush, paint brush and razor and the first and second shot molded structures are of contrasting colors.

The invention also relates to the use of the first shot molded structure to form an overmolded article having first and second molded structures of contrasting colors. Also disclosed is a method of making an overmolded article as described herein having first and second molded structures of such contrasting colors.

Another embodiment of the invention relates to a method for making a molded article by overmolding a first component over at least a portion of a second component, by providing mold parts to form a first mold having a cavity configured to define a first molded structure as disclosed herein; injecting a first molding material into the first mold cavity to obtain the first molded structure; providing additional mold parts to form a second mold having a cavity configured to define a second molded structure as defined herein; and injecting a second molding material into the second mold cavity to provide the second molded structure overmolded upon at least a portion of the first molded structure to form the article. The article is then recovered from the mold parts.

The first cavity is typically formed from mold parts that include a single or split mold for forming the working end, and from first upper and lower mold parts for forming the support core. Thereafter, the second cavity is formed by replacing the first upper and lower mold parts with second upper and lower mold parts to allow the overmolding.

When the article has sidewalls, the method includes configuring the sidewalls of the first molded structure with a sufficient height to prevent bleeding of the second material over the sides of the first molded structure. The second cavity may be configured such that the second molded structure also covers the end of the first structure opposite the working end. Additionally, the first mold cavity can be configured to provide the first molded structure with a tapered end opposite the working end, and with the sidewalls adjacent the tapered end including angled end portions to prevent bleeding of the second material over the sidewalls of the first molded structure adjacent the tapered end.

When the first molded structure includes one or more islands, the first cavity may be configured to define the one or more islands on the top or bottom surfaces of the core, or on both surfaces, and the second cavity is preferably configured to provide exposed surfaces of the islands in the molded article. The second mold cavity may also be configured to provide a uniform thickness or a varying thickness of the second molded structure to provide desired optical effects in the article.

The method may include configuring the first mold cavity to provide the islands with a circular, oval, polygonal or diamond perimeter and with one or more straight or angled sides that have the same perimeter as the exposed surface or a different perimeter, and optionally to provide the islands to collectively form a pattern or writing. Also, the injecting of different colored molding materials may be used so that the first molded structure and the second molded structure are of different colors with the color of the exposed surfaces of the islands contrasting with the color of the second molded structure. The color effects are heightened when the islands are provided with an angled side or sides.

The method may include configuring the first mold cavity to provide the first molded structure with a transition structure that is located in between and connected to the working end and core with the transition structure including one or more openings therein, and configuring the second mold cavity to allow the second molded structure to extend into and fill the one or more openings and provide an ornamental transition between the working end and the handle of the molded article. And the first mold cavity can be configured to provide the working end in the form of a tool selected from the group consisting of a spoon, fork, knife, toothbrush, paint brush and razor.

BRIEF DESCRIPTION OF DRAWINGS

Preferred features of the invention will now be described in connection with the appended drawings, wherein:

FIGS. 5A and 5B are cross-sectional views of an overmolded knife according to the invention taken along the center line of the transition structure looking at back and front perspective orientations to illustrate how the first and second molded structures intersect at the transition structure between the working end and the handle.

FIG. 11 is a cross-sectional view of the transition structure and handle to illustrate further flow details of the second shot as it travels along the back side of the first shot and into the transition structure.

FIG. 12 is a perspective view of the top of the handle and transition structure of the front of the overmolded fork of FIGS. 7C and 7D.

FIG. 13 is a perspective view of the bottom of the handle and transition structure of the back of the overmolded fork of FIGS. 7C and 7D.

DETAILED DESCRIPTION OF THE INVENTION

Figure 1:
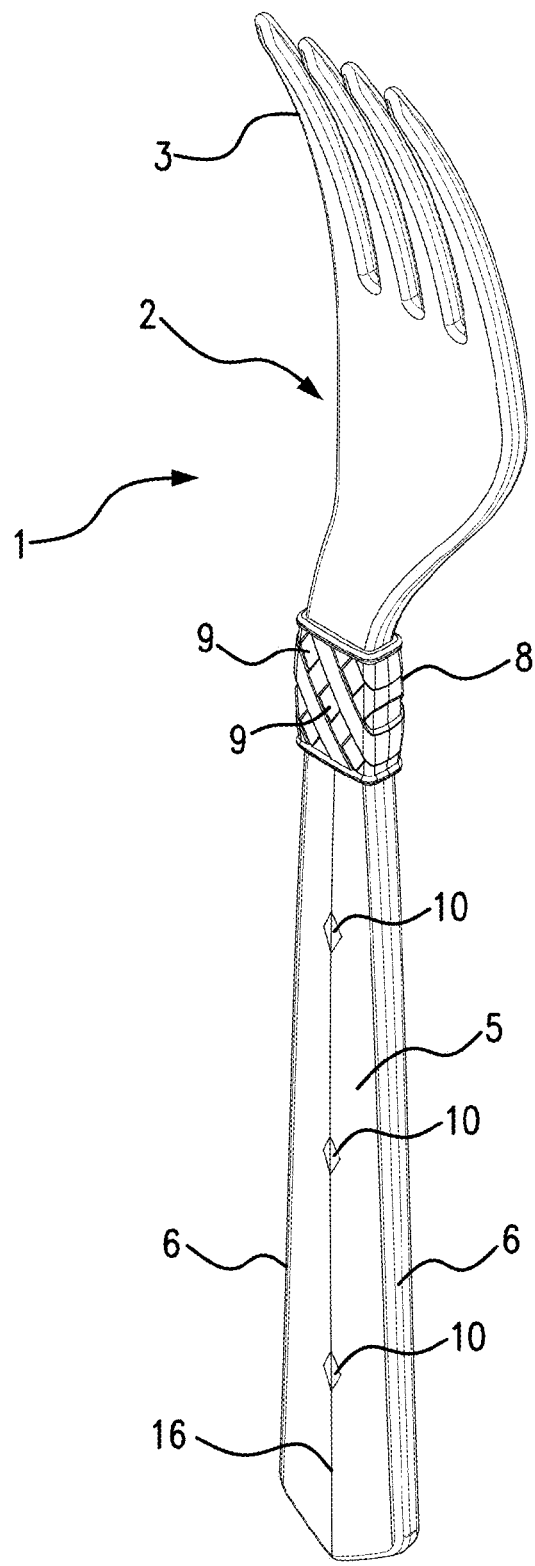
FIG. 1 is a perspective view of an overmolded plastic fork which is illustrated as a preferred embodiment of the present invention. Of course, it is easily envisioned that a spoon or knife can similarly be provided, as can other cutlery or hand held tools as disclosed herein.

The present invention is related to molded articles of various hand tools such as plastic cutlery and tableware. The unique design of the cutlery of the current invention provides a dual function of increased structural integrity and architecture, as well as pleasing and attractive optical effects.

As used herein, the term "plastic" means a material that may be fixed in a desired shape by molding. The plastic may be a resin and in particular a synthetic resin either based on petrochemicals or other biological materials such as cellulose, soybeans or agricultural by-products, all of which are often polymerized on cooling and may thus be formed in the desired shape by using injection-molding from resin particles or beads. The shaped plastic must be sufficiently rigid for use as cutlery and tableware and may derive its strength inherently, or when augmented by the configuration into which it is molded, that is, with ribs and beads for stiffening of hollowed areas, or by the use of reinforcing fibers. The plastic must also be capable of pigmentation in a variety of colors, texturization, and be non-toxic and able to incorporate additives. The plastic is also ideally inexpensive and readily available in large quantities. It also includes materials having an elastomeric nature that can be injection molded.

As an example of the present invention, in a cutlery set that includes three utensils, namely, a knife, fork and spoon, each utensil of cutlery in the set has a working part that contacts food, namely, the blade of the knife, the tines of the fork or the bowl of the spoon, and a handle that generally does not contact the food. The parts are molded together securely to form a complete utensil for use. In some embodiments, the article includes a transition structure for reinforcement and aesthetics purposes.

The invention also includes other working parts instead of cutlery, such as toothbrush and razor heads, putty knives, paint brush bases, windshield scrapers, squeegees or other tools that operate by manipulation of the handle and are typically disposable after a finite number of uses. The molded working ends may later be provided with bristles, appurtenances, or implements that are necessary to operate the tool.

The present invention is preferably directed to plastic cutlery and a molding method for making such cutlery. The term "cutlery" is used herein to refer to eating utensils such as knives, spoons, forks, salad forks, soup spoons, butter knives, steak knives, cocktail forks, serving forks and spoons, tongs, chop sticks, cake cutters, spatulas, ladles, food picks, kitchen utensils, and the like, all of which are characterized by a handle and a working part joined to the handle to form a tool. The handle is the part grasped by the user. The term "working part" in the present context of cutlery is the part opposite and joined to the handle of the cutlery that is configured to be used in the processes of holding, cutting, manipulating, serving, consuming or conveying food and that comes into contact with food in process and/or into contact with the mouth of the user.

In the following, the molded plastic articles of the invention will be illustrated as cutlery.

Plastic cutlery articles are typically injection-molded of either polystyrene and/or polypropylene resins. The material may instead be an injection-moldable thermosetting resin, that when set, is sufficiently rigid and strong for the purposes for which it is intended, non-toxic, safe for use, and both safely and legally disposable. It may be injection-molded in an assortment of colors or be transparent. One part may be molded from a material that is transparent or has one color, while the other part is made from a material having a different color or vice versa. The second part is overmolded onto the first part.

Resins which are useful in the present invention include polystyrene, polypropylene and homopolymers and copolymers of polyvinylchloride. Specific copolymers of vinyl chloride include polymerized monomers of acrylate, specifically methacrylate, acrylonitrile, styrene, phenylene oxide, acrylic acid, maleic anhydride, vinyl alcohol and vinyl acetate. Plant based or other compostable or biodegradable resins can be used if desired. Plastic cutlery grade polystyrene is generally preferred for providing the necessary strength at relatively low cost.

Plasticizers for use in the present cutlery and tableware may be use and would include compounds with low volatility and which have the ability to disperse polymeric resin particles. The plasticizers may facilitate adherence of the polymeric resin to reinforcement fibers. Typical plasticizers include esters, polyesters and oils.

The term "reinforcement", as used herein, refers to reinforcing fibers including glass, metal, ceramic, carbon or natural or synthetic organic fibers.

Curing of plastics may be accomplished by a variety of techniques known in the art including thermal, photoactivation, and e-beam or other radiation-type curing, depending upon the type of plastic used. Other thermoplastic materials simply harden and set during cooling to form the final article.

Disposable cutlery is typically made from so-called food-grade resins of polystyrene and/or polypropylene, also referred to herein as food-grade plastics, which are deemed safe for use in food-contact applications. Food-grade resins are typically polymeric resins that are manufactured under rigorous process control and supplied by resin manufacturers as virgin materials.

The present invention provides a method for overmolding one polymer upon another to form the article. The method involves molding a first polymer into the desired structure, and then overmolding a second polymer over a portion of the structure of the first polymer.

The first polymer may comprise a rigid polymer material that provides support and strength to the article. As used herein, "rigid" refers to a resistance to bending or being forced out of its configured shape.

Rigid polymer materials provide the necessary strength and durability, which is important for portions of the article that will be subjected to stresses and forces associated with gripping and using of the article, e.g., when cutting with a knife.

The second polymer is generally of the same material as the first polymer but typically is of a different color. The second polymer in certain embodiments may be a softer or less rigid plastic to impart improvements in appearance or functionality to the article. In this embodiment, the second polymer may be an elastomeric material that provides increased comfort and grippability to portions of the handle.

The handle of the molded article may have a desired shape. As shown below, when sidewalls are provided for the handle, the top and bottom surfaces of the handle may exhibit gently sloping walls that meet at an apex along a longitudinal center line of the handle. The top and bottom handle surfaces may instead be flat or slightly rounded. Alternatively, the handle may have another shape such as ones having a substantially circular cross section, a substantially square or rectangular cross section, or combinations of these.

As used herein, "substantially" has the same meaning as essentially, considerably or largely.

A portion of the first polymer may be molded as islands so as to enhance the appearance of the article. The islands may have a top surface that has a perimeter in the form of a circle, polygon, diamond or any other shape and one or more sidewalls that are sloped or angled with respect to the top surface. The sidewalls may have the same perimeter as the top and bottom surfaces or they may be different for imparting different visual effects. The sidewalls of the islands may have straight or vertical sidewalls to facilitate mold withdrawal. Alternatively, the sidewalls may be angled or sloped to facilitate overmolding of the second polymer by making it easier for that polymer to flow around and by the islands compared to islands having vertical sidewalls.

The islands may be configured as identifying characters (e.g., numbers, letters, or combinations) or of an engraving or embossment of a particular design. Typically the islands are made of a different color material than the second molded structure, such that the difference in colors enhances the visual contrast between the islands formed of the first polymer and the surrounding or adjacent second polymer.

These and other benefits, advantages and features of the present invention will become more fully apparent from the following different inventive embodiments which are discussed in more detail, referring generally to the drawing figures. It is to be understood that the disclosed embodiments are merely for illustrative purposes of the disclosure that can be embodied in various multiple forms. Also, the specific structural and functional details disclosed in the specification are not to be interpreted limiting whatsoever, but merely as representative basis for teaching the person having ordinary skill in the art to which the invention belongs how to employ the disclosed embodiments.

Figure 1A:
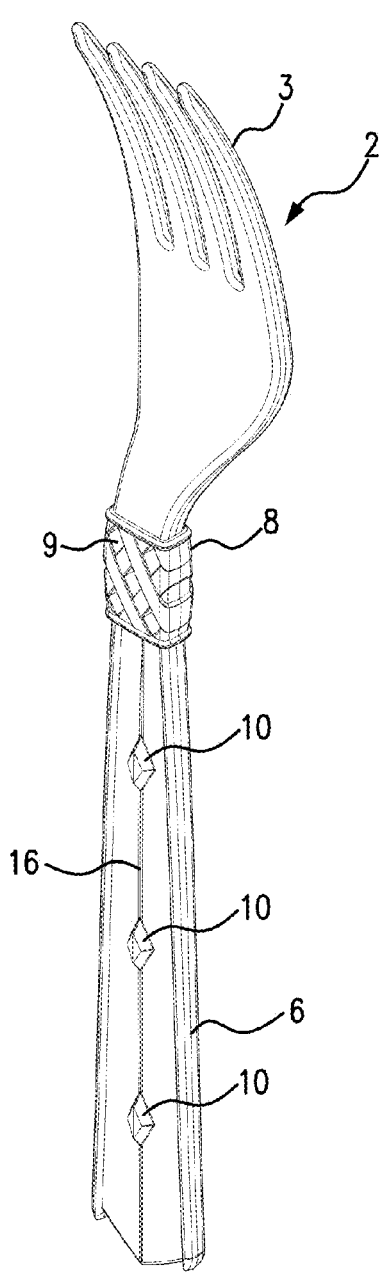
FIG. 1A is a perspective frontal view of the top surface of a first molded structure for the overmolded plastic fork of FIG. 1.
Figure 1B:
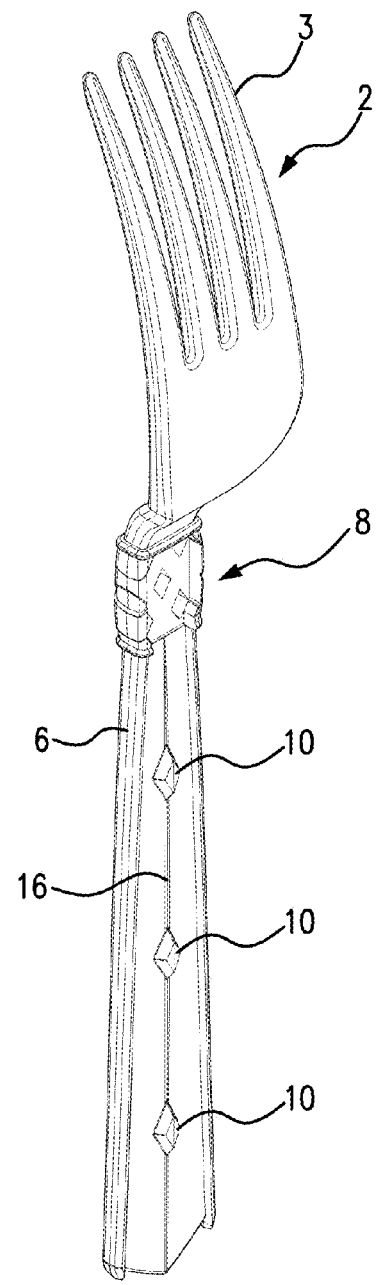
FIG. 1B is a perspective rear view of the top surface of a first molded structure for the overmolded plastic fork of FIG. 1.
Figure 6A:
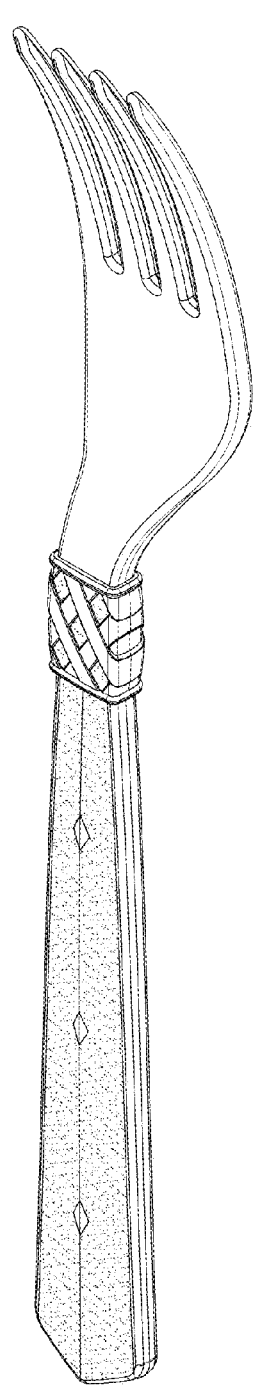
FIG. 6A is a perspective frontal view of the overmolded fork.
Figure 6B:
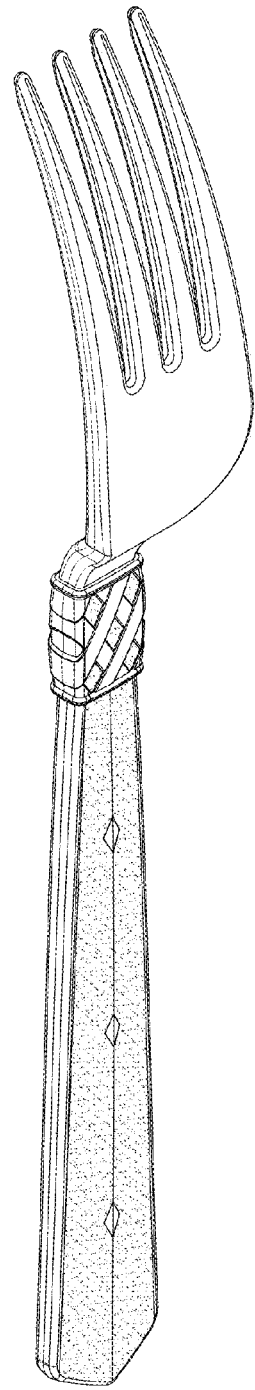
FIG. 6B is a perspective rear view of the fork of FIG. 6A.

An embodiment of the present invention is exhibited by a fork 1 as described herein and as shown generally in FIG. 1. The first molded structure of the fork is illustrated in FIGS. 1A and 1B, while the final molded article that includes the first and second molded structures is shown in FIGS. 6A and 6B. The fork includes a working end 2 that includes tines 3, and a handle 5 that extends longitudinally away from the working end 2 and includes opposed sidewalls 6 extending along its longitudinal length. The sidewalls 6 appear as I-beams in FIGS. 1A and 1B, and these are included to provide additional function to the article as described herein. The working end 2 is operatively connected to the handle 5 via a transition structure 8 which in particular provides aesthetics as well as a further mechanical connection between the working end 2 and handle 5.

To enhance the visual effects of the article, islands 10 are provided. These islands 10 form the appearance of rivets on the handle 5. The sidewalls 6 also contribute to the ornamental appearance of the article by mimicking a metal handle that has a colored overlay which in the present invention is the second molding structure of a different color. The different color of the second molding structure also is evident in the transition structure where certain of the openings 9 are of the color of the second molding structure (shown in darker shading) while the surrounding transition structure forms part of and thus is the same color as the first structure (shown as white). Also, the islands 10, being part of the first molded structure, have the same color as that structure and are preferably of a different color than that of the second molded structure. Such differences in color aesthetics enhance the visual contrast between the islands formed of the first polymer and the surrounding or adjacent second polymer mold.

If desired, the first structure may be provided with islands or similar configurations that appear as embossings, debossings, texture, engravings or the like. These islands and configurations also assist in the molding of the second structure by imparting stiffness or additional strength and rigidity to the first molded structure when placed in the mold to receive the second resin that is to form the second molded structure. Additionally, the provision of angled or sloped sidewalls rather than vertical sidewalls for the islands provides a different visual effect depending upon the thickness of the overmolded second structure. When the side or sides of the islands are angled, the visual effect varies as the thickness of the second structure over the side(s) varies.

The first molded structure preferably includes sidewalls extending at least along the length of the handle from the working end to the opposite end and having a height that extends above the top surface of the core, below the bottom surface or the core or both above and below the surfaces of the core. Additional visual effects can be provided on the handle 5 by the provided thickness of the second molded structure. For the portions that are provided upon the first molded structure, providing a uniform thickness of the second structure would result in the same color and optical appearance of that structure. Enhanced visual effects can also be created by varying the thickness of the second structure to create color differences. For example, when the first molded structure is white and the second is another color (such as blue, red, green etc.), thicker layers of the second molded structure will generally result in darker or deeper colors while thinner layers will be lighter. Thus, a skilled artisan can create many different types of designs and color combinations for the molded articles of the invention.

As noted herein, the articles of the invention are conveniently made by overmolding of a second shot of plastic material over a first shot of different plastic material to make the article. As various types of overmolding techniques are generally known to a skilled artisan such that all details do not need to be mentioned herein. The mold parts are designed and configured to produce the desired structures with the complete or nearly complete avoidance of parting lines, bleeding of the second material onto the first molded structure where not desired, and with designs that facilitate material flow and complete filling of all openings of the mold cavity without generating unfilled areas or air voids therein.

In particular, the first molded structure can be obtained by providing the first shot of injected plastic material into the first mold cavity. The first molded structure is shown in FIGS. 1A and 1B while the final molded article is shown in FIGS. 6A and 6B. The first molded structure includes the working end 2 and support core including islands 10 and sidewalls or side portions 6, with the transition structure 8, when present, connecting the two. The first molded structure is typically made in one color, shown as a white color, while the second molded structure is typically made in a different color, shown herein in some drawings with darker shading, and may be blue, green, red or another color that contrasts with the color of the first molded structure. Of course, the reverse is also possible with the first molded structure having a darker color and the second molded structure being white or a lighter color. Furthermore, one shot can be translucent or transparent with or without a color while the other shot can have a color. Although not preferred, each shot can be transparent, translucent or colored.

In particular, to prepare the first molded structure, mold parts are provided to form a first mold having a cavity configured to define the entire first molded structure. The working end, e.g., the fork and tines, can be configured in a one or two piece mold that is operatively associated with upper and lower mold parts that respectively form the top and bottom surfaces of the transition structure 8 and support core with the islands 10 and sidewalls 6. Next, a first molding material into is injected into the first mold cavity to obtain the first molded structure. Then, the mold parts that are holding the fork and tines remains in place as the upper and lower mold parts are removed and replaced by two different upper and lower mold parts which are configured to form a cavity that, in combination with the first molded structure, form the open areas that result in the second molded structure. A second molding material, generally of a different color, is then injected to form by overmolding the second mold structure in contact with and bonded to the first molded structure to form the molded article which is then recovered from the mold. Although described as the molding of a single part, a skilled artisan would realize that the mold parts can be designed to mold multiple first molded structures followed by multiple second molded structures.

Figure 2:
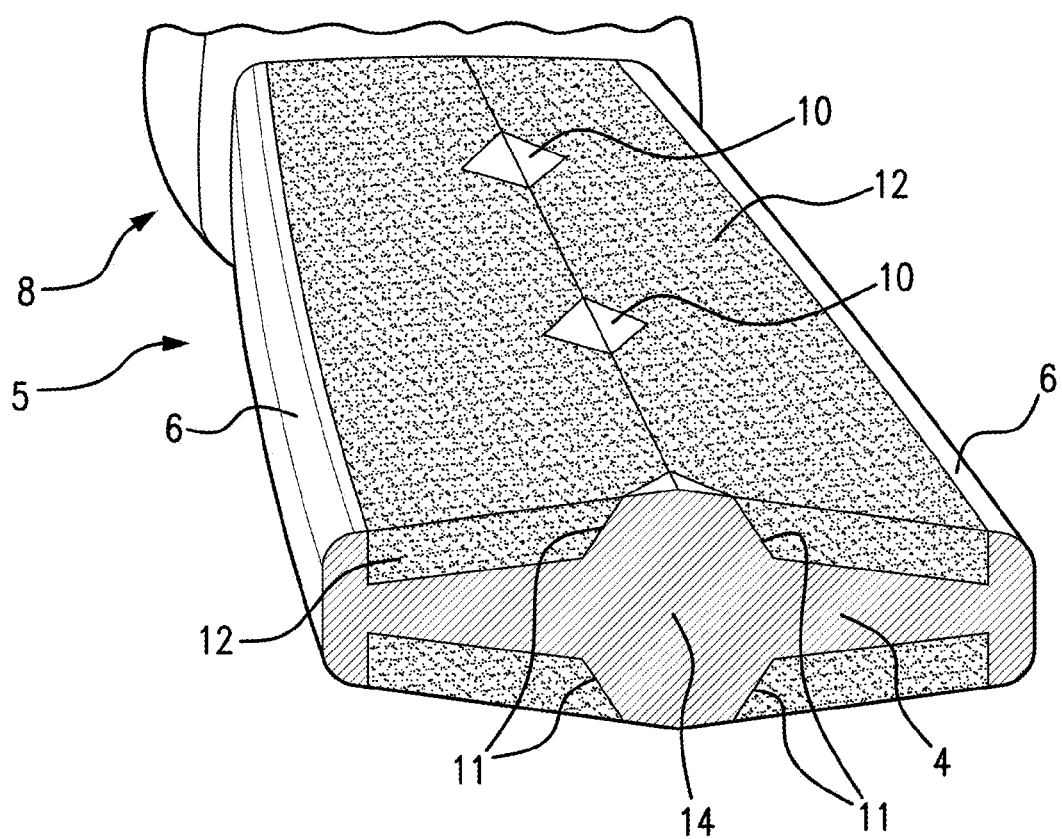
FIGS. 2 and 3 are cross-sectional views of the fork handle to illustrate further details of the first and second molded structures.

FIG. 2 shows the relationship between the first molded part 4 and the second molded part 12. As used herein in the disclosure, the "first shot" refers to the first molded part made by the injection molding of the first mold cavity with first polymer material resin, while the "second shot" refers to the second molded part made by the injection molding of the second mold cavity with second polymer material resin. FIG. 2 also depicts the sidewalls 6 that at least run along the length of each side of the article from the transition structure to the end of the handle. In addition to providing strength to the article due to the formation with the support core of an overall "I-beam" like configuration, the sidewalls act as a shutoff for the injected second polymer and advantageously maintains the second polymer in the desired position, preventing it from bleeding onto the sidewalls of the first molded structure or from flowing onto the sides of the handle.

Figure 3:
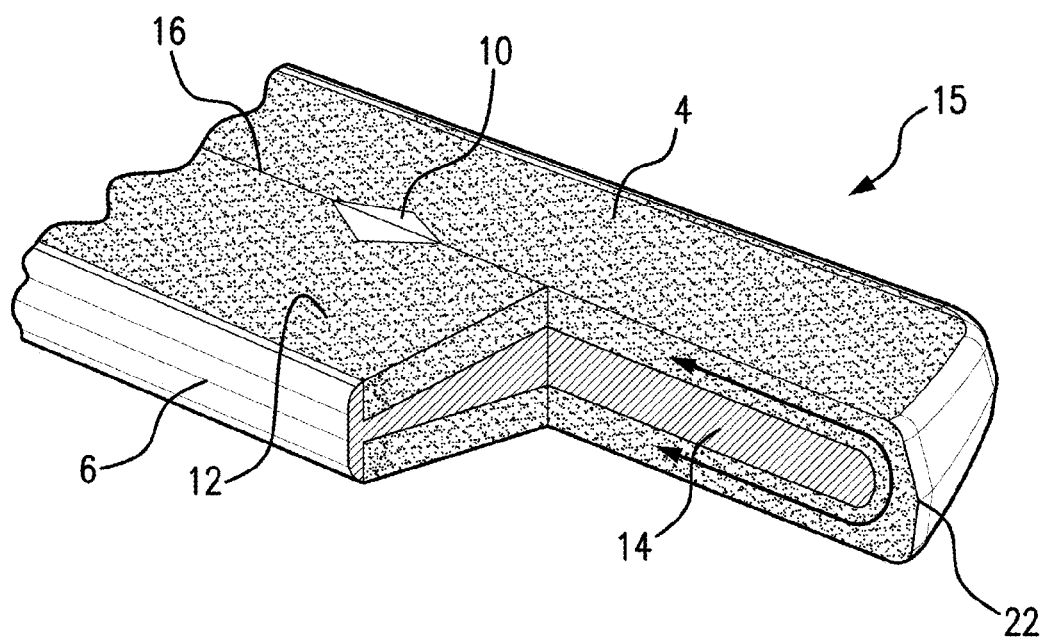

FIG. 2 also depicts the islands 10 that appear as diamond-like rivets. The islands are preferably and advantageously arranged in a line along the longitudinal axis 16 of the top surface of the handle 5 as shown in FIGS. 1 and 3. The islands 10 contribute to the strength of the article as well as to its appearance.

The angled sidewalls 11 of the islands advantageously conform to an angle of at least about 30 degrees with respect to a horizontal plane passing through the center of the support core 4, with the chosen angle preferably ranging between approximately 5 to 50 degrees as desired. The angled sidewalls provide a transition of darker to lighter color from the start of the sidewall to its end at the exposed surface of the island. It also assists in the flow of the injected material by avoiding sharp corners that would be present if a vertical sidewall would be provided. The angled sidewalls when made of a rigid polymer also assist in providing lateral stiffness to the core 4.

FIG. 2 also provides details of the configuration of the islands that are provided by the first molded structure. One purpose for these islands is to provide unique and special pleasing optical effects to the handle. The mere inclusion of the islands themselves whether made in a different color from the second molded structure or not mimics the rivets that are used in holding together wooden or metal handles on conventional flatware. Utilizing a different color for the islands enhances this effect.

The islands 10 have a top surface that may be configured in a number of ways with different shapes and topographies. As shown in the drawings, the top surface of the islands has a diamond shape (or that of an off center rectangle). As in the preferred embodiment, the top surface of the second molded structure includes sloping walls, the top surface of the islands include the sloping walls as well as the apex where they meet along the longitudinal axis 16 of the handle. Of course, the top surface does not require that topography and it can be flat or rounded instead. The islands can protrude from the top surface if desired. It also can be a single sloped surface if the top surface of the handle is configured in a similar way. The designer is provided with many alternatives as the top surface of the islands can conform to or be different from the top surface of the second molded structure or the handle.

And while a diamond perimeter is shown, the islands can have any desired perimeter that is circular, oval, polygonal or combinations thereof. The same is true of the perimeter of the angled sidewalls 11 of the islands, as they can terminate in a perimeter that matches what is provided for the top surface of the islands or they can be made to contrast with the island top surface. For example, the sloped walls descending from the diamond perimeter of the top surface of the island can gradually transition to an oval perimeter for the base of those walls. This transition can instead be stepwise with the upper portion of the island sidewall being of diamond shape and the lower part being oval with a step-like transition point. A smooth and gradual transition is preferred to facilitate mold design by avoiding sharp corners which is of particular interest when designing the first shot mold(s).

Also, the islands can be centered in the first molded structure or can be offset as desired. The top exposed surface of the islands can be flat, flush with or raised above the surface of the handle, or can have different shapes or configurations that are centered on the exposed surface or offset. Thus, a designer is provided with numerous design options for enhancing the aesthetic effects of the article, including combining islands to form letters, script or various patterns that appear to be engraved in the second molded structure of the handle. As noted, the sides of the islands can be vertical or straight or could be angled to assist in facilitating the injection of the resin that forms the second molded structure.

Preferably, the islands 10 can be arranged in the same vertical location in the top and bottom surfaces of the handle so that they appear to be connected or passing through the handle. This is particularly useful when attempting to mimic the appearance of rivets. Of course, the islands in some situations can be randomly oriented as desired for the particular aesthetic effect.

The angled sidewalls can also be used to vary the appearance of the different color of the second molded structure due to the different thickness of that structure on the side(s) of the islands 10. The second shot resin or molding material 12 is formed around the raised islands of the first shot molding material 14, so as to advantageously provide rivet appearing structures in the handle. As can further be viewed in FIG. 2, the diamond shaped islands 10 are formed by the first mold material extending above or at least to the same level as the second mold material, which flows around the islands 10.

As shown in FIG. 2, the second shot molding material 12 has a uniform thickness on the top and bottom surfaces so that the handle has a uniform color appearance. Other aesthetically unique and optimal optical color effects can be achieved by providing a differential thickness variation of the second shot 12 across the central part of the horizontal plane of the support core 4. In either case, the handle 5 of the cutlery is afforded with another advantage, which is an improved stiffness due to the relatively thicker central portion of the first molded structure. The thicker central portion which tapers off to the sidewalls also reduces material usage and cost as well as adding to the aesthetics of the design. The gate that allows entry of polymer along a flow channel for this part of the structure is located at the thickest portion of the handle to allow for easy access of the first mold material from its injection point 22 at the bottom of the handle into the central opening and then through to the working end and outwards to the sidewalls. This is especially true, because the first shot material must flow along the center of the handle from the site of injection to the opposite working end 2. The creation of the thickness variation of the second shot 12 should not merely be construed as being limited to what is exactly depicted in FIG. 2, but can equally be formed through the creation of other structures readily apparent to the skilled artisan formed at the end of the support core 4.

The top 12 and bottom portions of the second molded structure are shown to be uniform in thickness which leads to a somewhat uniform optical effect of the color of the handle 5. Alternatively, the first shot can be made of varying thickness while the overall thickness of the handle is maintained. This results in the variance of the color appearance of the different colored second molded structure. Other arrangements of the second shot 12 can be made to obtain a variation of thickness extending from generally the central part of the support core 4 horizontally and outwards bi-directionally towards each of the sidewalls 6 to afford the color variations in the handle. This can be done in a uniform or random arrangement as desired.

And as noted herein, the other second shot structures may equally be formed as a completely flat or straight line extending from one sidewall 6 to the other opposite sidewall 6. They could similarly be formed as two separate straight lines meeting one another at the center of the support core 4 forming an angle upon connection, or as a curved oval-like structure extending upwards or downwards from one sidewall 6 to the opposite sidewall 6.

When overmolding, the second shot material is also introduced at the same injection point 22, however, it needs to flow along the upper and lower portions of the first molded structure to the transition structure near working end 2 where it can flow into that structure to provide a contrasting appearance. This is best shown in FIG. 1 as diamonds 9 in transition structure 8.

The overall appearance of the handle can be varied as desired. For example, the top and bottom surfaces can be symmetrical or they can be different. Any particular configuration of the handle is suitable so long as it is designed to allow grasping and use for its intended purpose. Thus, the outer surfaces of the handle may be flat, curved, angled, wavy or oscillating or in any combination thereof. The same is true of the sidewalls 6. While a preferred appearance is with the sidewalls as side rails, these can be provided with straight, curved or angled outer profiles.

Now again referring to FIG. 2, the second shot overmolding technique will be described. This molding technique in its essence encompasses a method for overmolding one resin or polymer upon another to form thereby form the article. As such, the method involves molding a first polymer into the desired structure, and then overmolding a second polymer over a portion of the structure of the first polymer. As shown in FIG. 2, the first shot molds the first molded structure which forms the inner part of the handle and the working end, whereas the second shot molds the outer part of the handle with a portion injected into the transition structure 8 to provide a contrasting color therein. Of course, the transition structure is an optional component as it is primarily used to provide additional aesthetic effects to the article. The present invention shows how to easily add contrasting designs or portions of the transition structure when it is included.

FIG. 3 depicts the injection molding of the second shot 12 over the first shot 14. An essential feature of the second shot molding technique involves the sidewalls 6 running longitudinally along the length of the handle and extending on opposite sides of the support core 4. These sidewalls 6 act as a shutoff for the injected second polymer and advantageously maintains the second polymer in the desired position, preventing it from bleeding onto the sidewalls of the first molded structure or from flowing onto the sides of the handle.

Additionally, the sidewalls 6 of the first molded structure are configured with a sufficient height that matches that of the proposed second molded structure in order to prevent the aforementioned skinning and bleeding of the second material. This feature is further afforded by the fact that the sidewalls 6 are built in such a way that they are flat on the top and bottom although they can be curved or rounded at the corners between the sides and tops or bottoms. In contrast, if the sidewalls 6 had been manufactured with completely curved or rounded tops and bottoms, an unwanted skinning or bleeding across the first shot would likely occur. Having the sidewalls with flat top surfaces that stick up along the sides of the handle provides a shut off that is perpendicular to the tool open/shut direction, whereas if they did not stick up and they remained thin to the edge of the part, bleeding or skinning would be expected around the edges of the first shot by the second shot.

During the second shot, as noted, the second molding material can fill the front and back of the handle from the injection site 22. The injection site 22 is located at a central part of the rearmost end 15 of the handle. The resin flow is indicated by arrows.

Figure 4A:
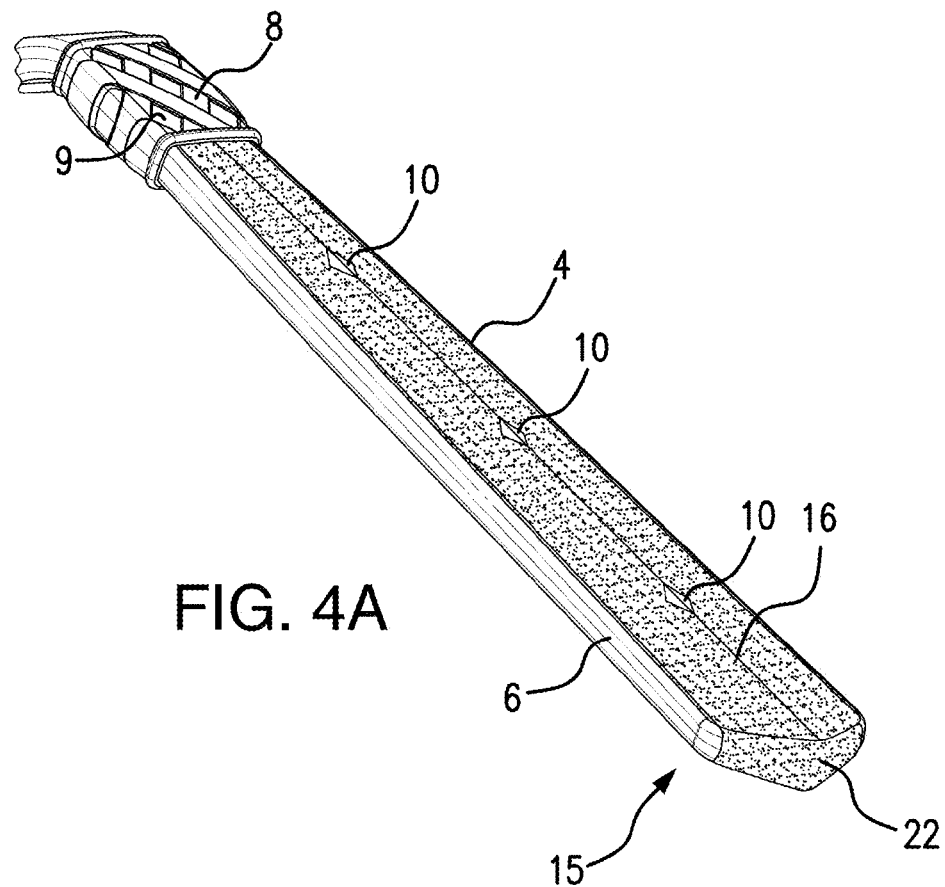
FIG. 4A is a perspective and partially sectional view of the top surface and side of the handle of the fork of FIG. 1.
Figure 4B:
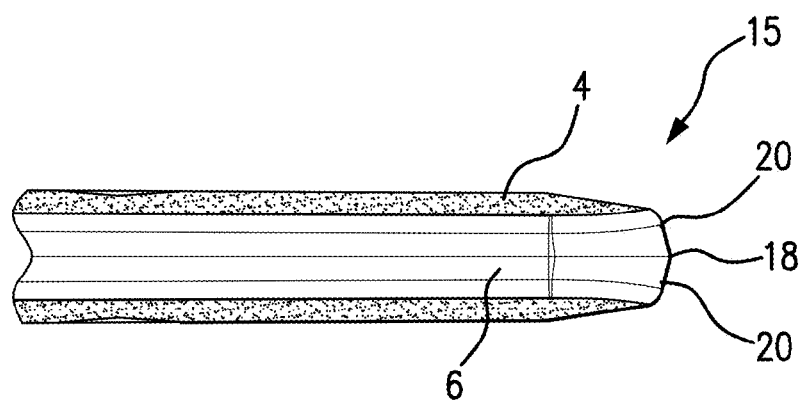
FIG. 4B is an expanded view of the end of the corner of the handle depicted in FIG. 4A.

FIGS. 3, 4A and 4B illustrate that the second mold material covers the central portion of the rearmost end 15 of the handle, thus providing continuity between the top and bottom surfaces of the second molded structure. This also enables the polymer materials to be injected at the rearmost end of the handle. While it is possible to continue the sidewalls 6 at that area, it then would require that the injection point for the second mold material be placed elsewhere. Instead, overmolding the rearmost end 15 of the handle allows the injection point 22 to be in a less conspicuous location on the molded article. Of course, for articles that have sidewalls 6 that continue completely around the handle, the injection point for the second shot would be located in a different position so that the second polymer can flow into the mold cavities to form the second molded structure. A skilled artisan would be able to select the most desirable injection points for the specific first and second polymer or resin injections to provide the first and second molded structures.

FIG. 4B more specifically depicts how the rearmost end of the sidewalls 6 act as a shut off of the second mold material thereby particularly preventing skinning or bleeding at the rearmost end of the handle 5 onto the sidewalls 6 at that location. The rearmost end 20 of the sidewalls 6 are designed to be tapered and to meet at a central parting line 18 of the article. The tapered surfaces form an angle of between 10 and 30 degrees and preferably about 13 degrees so as to prevent the second shot from skinning, or bleeding over the corners of the sidewalls 6 of the first molded structure. This also prevents blow by at or skinning over those corners. Notwithstanding the adequate tapering or angling of the ends of the sidewalls, additional angling or crush ribs may be resorted to, if the situation permits and the shut-off turns out to be insufficient as desired by the instant invention. These additional structures are undesirable and typically not necessary when the ends are tapered or angled as described and shown.

FIGS. 5A and 5B are sectional views taken along the center line of the transition structure 8 looking at back and front perspective orientations to illustrate how the first and second mold parts intersect at that area. These figures also show how the second mold material flows into the transition structure 8 of the article. The transition structure 8 has a structural component which attached the working end 2 to the longitudinal core 4. For overmolding the second structural component, the injected second polymer travels towards the transition structure 8 along the flow lines shown by arrows. When arriving at the transition structure 8, it forms a well behind the first molded structure and then travels into the transition structure 8 filling in the openings 9. This achieves discontinuous color breaks in the transition structure 8 in the form of filled holes 9. This effect is achieved without the need for slides or lifters, thus simplifying mold design. For best results in achieving proper molding in the holes, the size of the holes should be relatively small with regard to the size of the well of injected polymer. And while all different shapes and sizes are possible, extremely narrow corners should be avoided with the holes being rectangular, square or diamond shape or with rounded configurations such as circles or ellipses.

FIGS. 6A and 6B illustrate the final molded article in the form of a fork. The shading shows the different color of the second shot in the article. As noted herein, the working end can be a spoon or knife but would present similar views for the handle with only the working end being different due to the specific type of working end that is provided as disclosed herein. Also, although the islands are shown as diamonds, these can be provided in the different shapes as disclosed herein.

FIGS. 7 to 13 illustrate another embodiment of the invention, also in the form of a fork. The first shot 105 is illustrated in FIGS. 7A and 7B and shows a working end 110 that includes tines 120, a transition structure 130 and a handle 140. The first shot of the handle 140 includes sidewalls 145, islands 150 and an opening shown as hole 155. The islands preferably have straight or vertical sidewalls to facilitate manufacture of the article as described further herein.

Figure 7A:
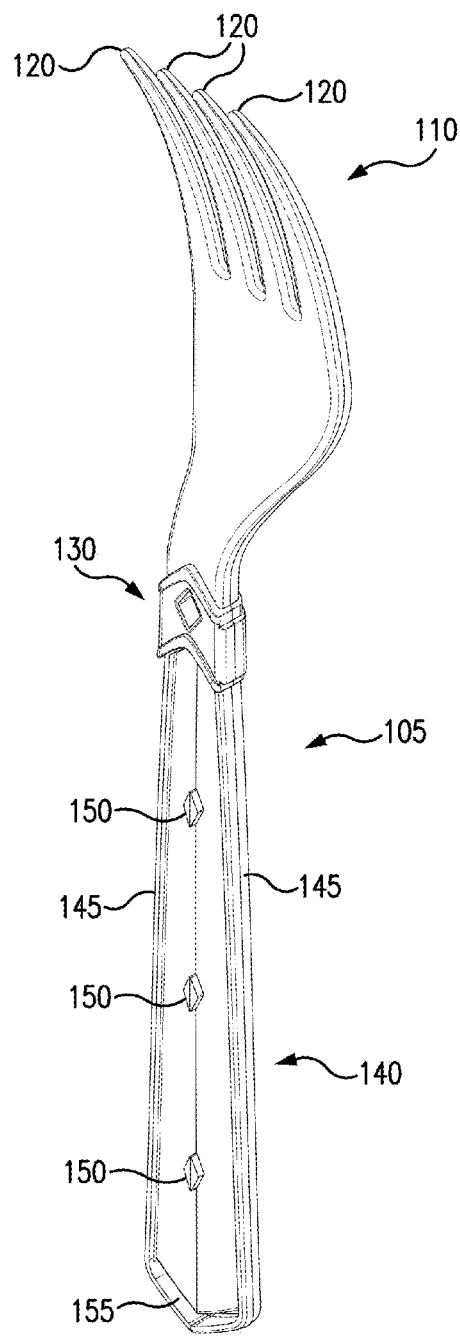
FIG. 7A is a front perspective view of an alternative embodiment of first molded structure for an overmolded fork of the present invention.
Figure 7B:
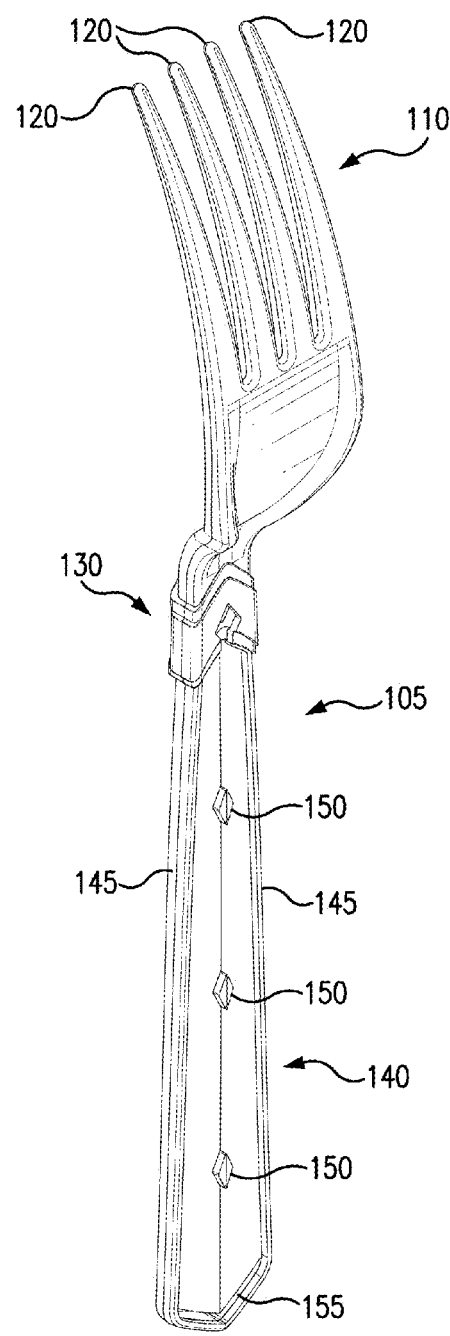
FIG. 7B is a back perspective view of the first molded structure of FIG. 7A.
Figure 7C:
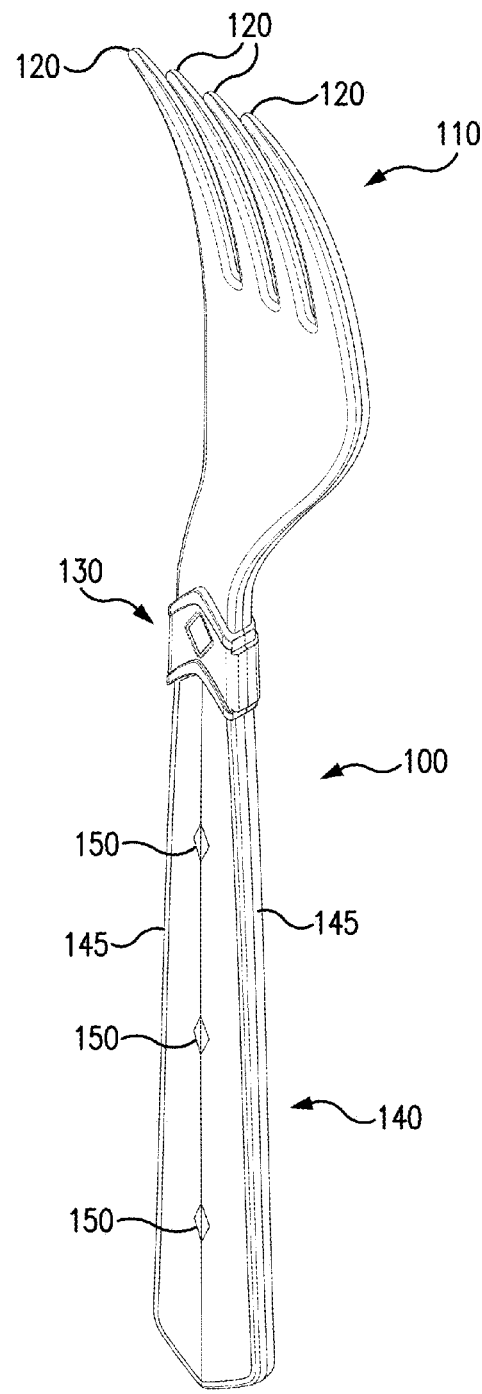
FIG. 7C is a front perspective view of the final molded fork that is made by combining first and second molded structures including the first molded structure of FIGS. 7A and 7B.
Figure 7D:
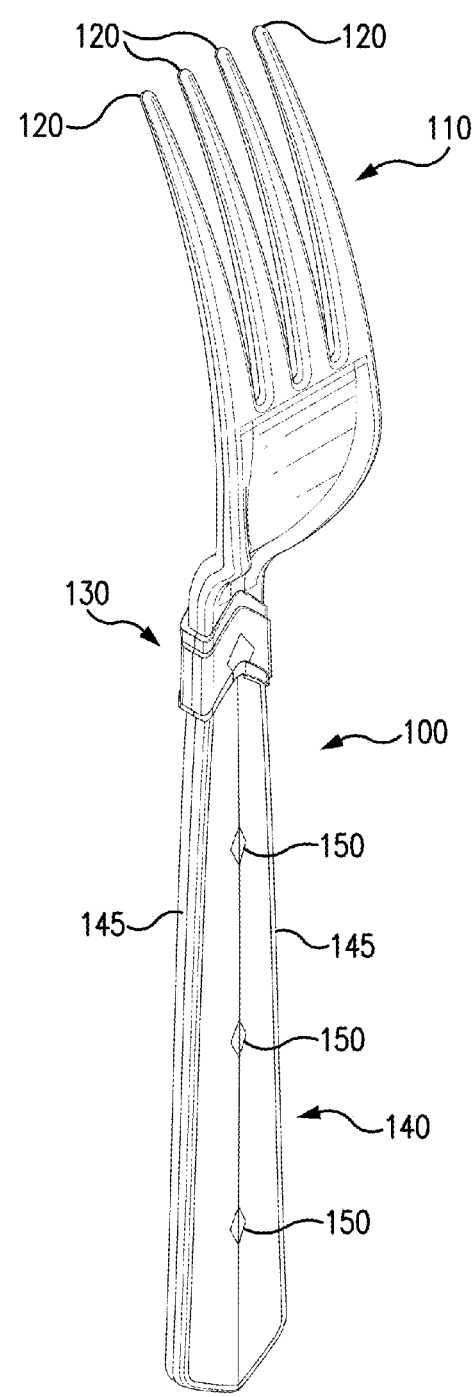
FIG. 7D is a back perspective view of the final molded fork of FIG. 7C.

FIGS. 7C and 7D illustrates the final molded fork 100 that includes the first and second molded structures. In addition to what is shown in FIGS. 7A and 7B, FIGS. 7C and 7D show the upper and lower portions of the handle and the hole 155 filled with the second shot.

The articles of FIGS. 7 to 13 are manufactured using a generally known core-back injection molding process as disclosed in U.S. Pat. No. 5,049,343, the entire content of which is expressly incorporated herein by reference thereto. As noted, the present articles are designed with features in the first molded structure that facilitates and enhances the production of the second molded structure.

Figure 8:
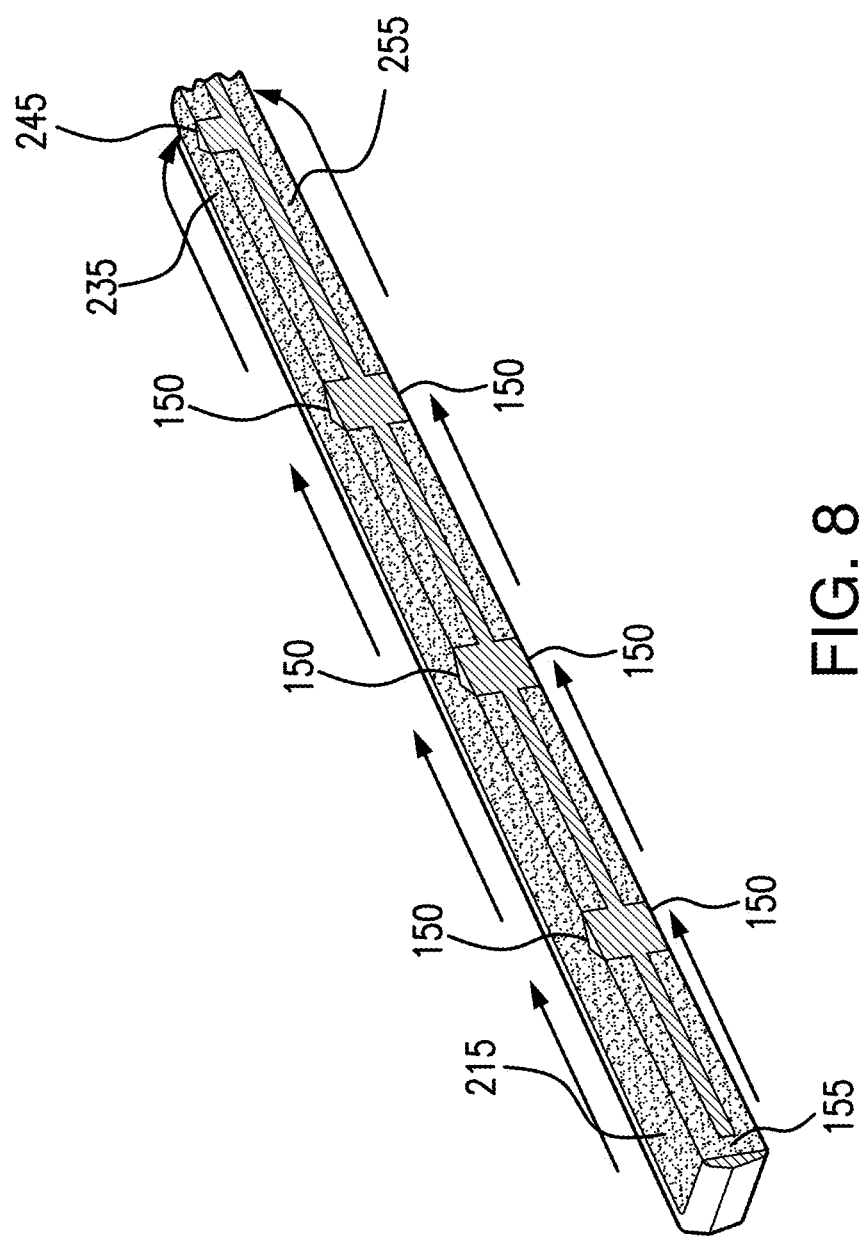
FIG. 8 is a cross-sectional view of an alternative embodiment of the handle to illustrate flow details of the second shot along the top and back sides of the first shot and into the transition structure between the working end and handle.

The design of the first shot shown in FIGS. 7A, 7B and 8 receives the injected second material so that it can fill in all open areas and form the second molded structure to complete the article. The injection point A (see 160 in FIG. 9) is near the end of the handle close to the opening 155 between the top and bottom surfaces of the first molded structure. The second material thus flows from the injection point as shown by the arrows. The upper surface of the first shot provides an open area 215 that is filled with the second material to result in the thickness of the second shot on the top and bottom of the first shot molded structure.

In FIG. 8, the bottom part of the second molded structure is shown to have a uniform thickness. Because the core-back mechanism needs to be of uniform thickness, the first molded structure on the core-back side needs to be designed to receive a uniform thickness of the second shot material on the bottom, core-back side. In fact, any varying of second-shot thickness to promote even resin flow has to happen on the non-core back side.

This embodiment provides a number of useful features to facilitate overmolding, including (i) a flow-through hole in the handle portion of the first shot structure, (ii) a second flow-through hole of the first shot structure at the point of the transition structure or neck ornamentation (to allow the second shot material to flow through to the back side of the neck ornamentation and appear as a design element on the front side), and (iii) a flow channel for the second shot material also in the neck ornamentation area. These features are described with regard to FIGS. 9-13.

Figure 9:
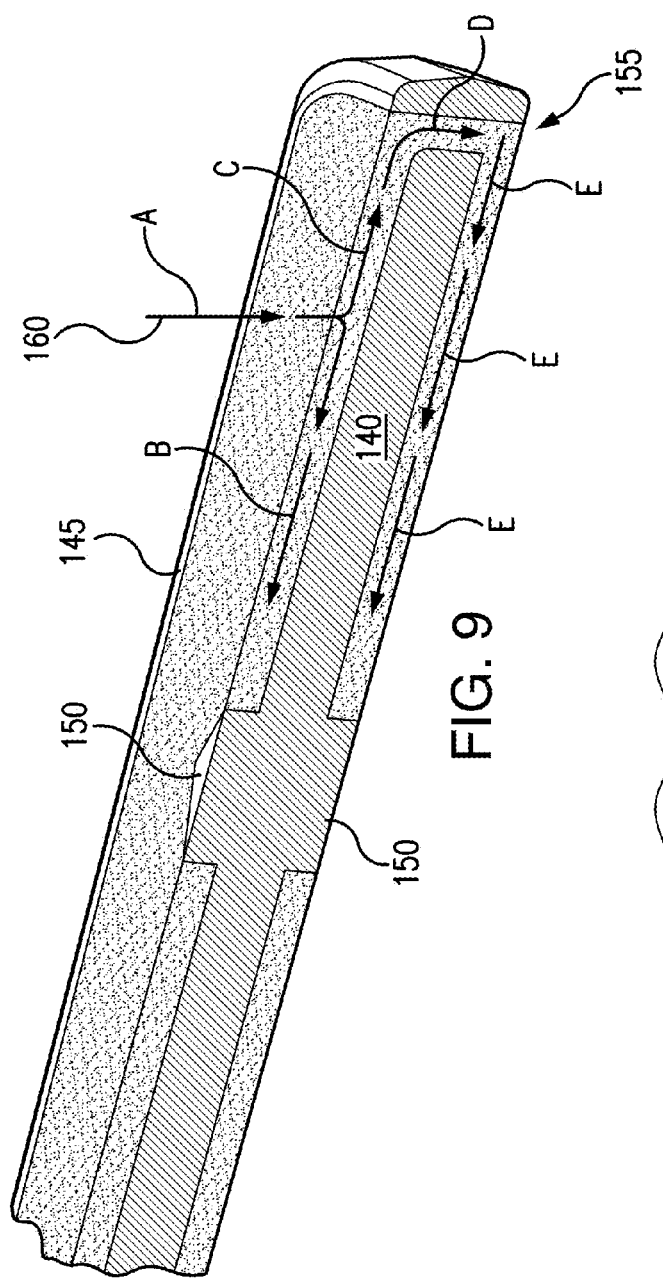
FIG. 9 is a cross-sectional view of the handle to illustrate further flow details of the second shot as it is injected to overmold the first molded article.
Figure 10:
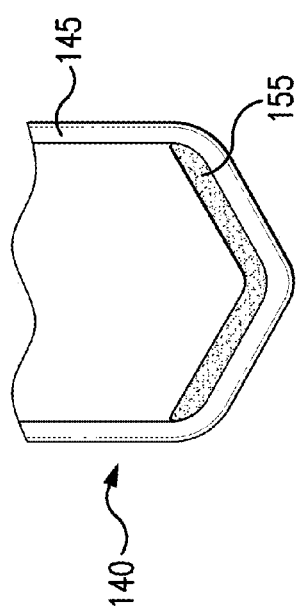
FIG. 10 is a top view of the end of the handle to illustrate the opening that allows the second shot as it is injected to flow from the front of the first shot to the back.

FIG. 9 is an illustration of the injection of the second shot material onto the first molded structure. Second shot material 160 is injected onto the lower top portion of the handle 140 of the first molded structure where indicated by the downward pointing arrow A. The flow of material is shown by arrows B and C.

At the end of the handle, the second material flows through hole 155 along arrow D to gain access to the lower part or back side of the handle first molded structure. At that point, the material flows along the back part of the handle to fill in all open areas of the second shot geometry on the lower side of the handle.

The second shot material flows past the islands 150 which are provided on both the upper and lower surfaces of the handle 140. In particular, this arrangement favors overmolding on the upper and lower surfaces of a generally elongated article with emphasis on the ease of a two sided overmolding upon the first molded structure. Placement of the hole 155 near the end of the handle is preferred but is not critical. The hole can be placed anywhere on the first shot near where the second shot material is injected.

The top surface of the first molded structure may optionally include one or more islands 150 positioned in a predetermined alignment with respect to the sidewalls, with the second shot material covering the side(s) but not the exposed surfaces of the islands. Also, the bottom surface of the first molded structure may further comprise one or more islands 150 which are positioned in a predetermined alignment with respect to the sidewalls, and again with the second shot material covering the side(s) but not the exposed surfaces of the islands. And in this embodiment, the side(s) of the islands would be vertical or straight.

The exposed surface of the islands 150 may have a circular, oval, polygonal or diamond perimeter and with vertical or close to vertical side(s) that have the same perimeter as the exposed surface of the islands. Alternatively, the islands can be configured as alphanumeric characters or text with the islands collectively forming a pattern or writing. The first shot and second shot are preferably of different colors such that the color of the exposed surfaces of the islands contrast with the color of the second shot. The islands also may be configured to appear as rivets to enhance the appearance of the utensil or other molded article.

The interface surfaces on the back side (or core-back) of the cutlery between the first and second shots should preferably have a zero degree draft or as close to zero degrees as possible. Generally, the draft angle for these interface surfaces will be less than ½ degree. This is in contrast to the front sidewalls that are formed by the first mold and that would have normal draft angles that are typically above ½ and as much as around 2 to 3 degrees. The goal is to have completely vertical walls or sides for the core-back structures of the first molded structure. These interface surfaces includes the sides of the islands on the lower handle surfaces, and the sides of wall 145 on the lower surface that face the handle interior. Providing these surfaces with the zero degree draft is a good injection molding technique that ensures optimum product quality with less flashing or other deposition of undesired material that is injected into the molds.

Referring now to FIGS. 11-13, the injected material for forming the second shot flows past the islands 150 on the upper and lower surfaces of the first shot of the handle, as shown by arrows B and E respectively. Optionally, on the lower surface, the material continues to flow as shown by arrow F into hole that forms a cavity that extends back to the upper surface of the handle. The injected second shot material flows through the return hole to create a separate second shot geometry on the upper surface of the part. The second shot material fills the cavity and the second shot geometry forms a decorative feature 165 in the transition structure 130 on the upper side of the article. The decorative feature may be a diamond 165, preferably of contrasting color, as provided by the second shot injected material, with the feature positioned on upper surface 180 of the transition structure 130. And while a diamond is illustrated, the decorative feature may have a circular, oval or polygonal or perimeter. Depending upon the size and location of the design, a second hole may not be necessary.

The combinations of these front to back holes and the zero draft angles for the walls and islands facilitate the efficient manufacture of the articles both as to the provision of higher cavitation tooling. This is also an optimal design for allowing the cores of the first molds to move in and out when reconfiguring to change from the first shot cavity to the second shot cavity. This reduces the maintenance required on the molds.

FIG. 13 illustrates the lower side of the molded article which include a decorative feature 185 in the transition structure, also in the shape of a diamond although circular, oval or polygonal or perimeters are also possible. This feature is different from that of the embodiment of FIGS. 1 and 6. Decorative feature 185 includes a channel 188 which extends to the second shot on the lower side of the handle, as this is the path over which that the second shot material will flow to form the decorative features 165, 185.

Also, decorative feature 185 is provided in lower surface 190 which is raised above the lower surface of the handle. Raised lower surface 190 is also configured with the same shaped top and bottom boundaries as upper surface 180. These coordinated structures allow multiple articles to nest with the raised boundaries 170, 175 of one article surrounding raised lower surface 190 of an adjacent article positioned above it. And while the configurations of the raised boundaries 170, 175 is not critical, the consideration that will facilitate nesting is to form the raised lower surface with a corresponding configuration. As shown, the V shaped boundaries 170, 175 match the V shaped ends of the raised surface 190.

The first or second material to be injected is preferably a plastic resin, a polymer, an elastomer, or a polyurethane material and is used to form the first or second shots. As noted, one material contrasts the other by color, texture, hardness or another physical property. The injection of such materials is also improved in that the number of injection ports is reduced due to the provisions of the two through holes that direct the injected material from one side of the first shot to the other side and then back again to the first side.

As noted, the term zero degree draft or zero degree draft angles includes angles of zero degrees or as close to zero degrees as possible, with these angles being less than 2 degrees, and preferably less than ½ to 1 degree.

The molds provides different cavities that are configured to form the second molded structure in the open volume between the mold and the surface of the first molded structure, with the second molded structure not extending over the entire surface of the first molded structure. Thus, the injection of the second material forms the second molded structure covers only a portion but not all of the surface of the first molded structure. The second material can be the same or a different plastic or polymer, elastomer or polyurethane material. Advantageously, the second material is different from the first material in one of color, type of material, texture, hardness or other physical property.

FIGS. 7C and 7D illustrate the final molded fork 100. Of course, it is easily envisioned that a spoon or knife can similarly be provided, as can other cutlery or similar sized disposable articles such as toothbrushes, razors and the like. In essence, it should be understood that the foregoing is solely considered as illustrative only of the principles of the invention. Furthermore, since numerous alterations and modifications and changes will readily be apparent and effected thereto by those having ordinary skill in the art, it is not desired to limit the invention to the exact constructions as demonstrated in this disclosure. For example, for certain molded articles, the first and second molded structures can be made separately and then joined together with adhesive or in a snap-locking manner, although this takes additional manufacturing time compared to an overmolded article. Accordingly all suitable modifications and equivalents may be resorted to falling within the scope of the invention so as long as, all the desired inherent technical features and attributes are not lost.

In other modifications, the molded articles can have any other dimensions than the ones specifically described herein. Exemplary handles may have a flattened or slightly rounded cross section, but other shapes such as a substantially circular cross section, a substantially square or rectangular cross section, or combinations of the above can equally be used. Moreover, the islands may have a top surface comprising any suitable shape or topography.

Even though, a fork is illustrated as an example, the invention similarly pertains to any other hand tool, which is encompassed by the scope of the present invention. As such, the invention similarly encompasses hand tools such as but not limited to knives, spoons, forks, salad forks, soup spoons, butter knives, steak knives, cocktail forks, serving forks and spoons, tongs, chop sticks, cake cutters, spatulas, ladles, food picks, kitchen utensils, and the like.

Unless defined otherwise, all technical and scientific terms used herein have same meaning as commonly understood by the person of ordinary skill in the art to which this invention belongs. As used herein and in the appended claims, the singular form "a", "and", and "the" include plural referents unless the context clearly dictates otherwise. All technical and scientific terms used herein have the same meaning. Thus the scope of the embodiments of the present invention should be determined by the appended claims and their legal equivalents rather than by the Figures.

What is claimed is:

1. A molded spoon or fork article comprising:
a first molded structure that includes a working end and a longitudinal support core extending away from the working end, the core including top and bottom surfaces and opposed sidewalls located at least along the length of the longitudinal support core, wherein the top surface of the support core is tapered from a relatively thicker central longitudinal portion to relatively thinner side portions that are connected to the sidewalls; and
wherein the sidewalls of the first molded plastic structure have a height that extends above the top surface of the longitudinal support core, and a second molded structure is present upon at least the top surface of the longitudinal support core of the first molded structure between and coincident substantially with the height of the sidewalls forming with the support core a handle for the molded article.

2. The molded article of claim 1, wherein the longitudinal support core of the first molded plastic structure includes the sidewalls and one or more islands having an exposed surface and one or more sides to facilitate molding of a second molded plastic structure upon the first molded plastic structure, with the islands being positioned in a predetermined alignment with respect to the sidewalls, and wherein the second molded plastic structure covers the side(s) of the islands but not the exposed surface(s) of the island(s).

3. The molded article of claim 2, wherein the sidewalls of the longitudinal support core have a height that extends below the bottom surface of the longitudinal support core, wherein the longitudinal support core appears as an I-beam, and wherein the second molded structure is also present upon the bottom surface of the longitudinal support core between the sidewalls.

4. The molded article of claim 3, wherein the top and bottom surfaces of the core comprise the one or more islands, with the islands being positioned in a predetermined alignment with respect to the sidewalls, and wherein the second molded structure covers the side(s) but not the exposed surfaces of the islands.

5. The molded article of claim 4, wherein the bottom surface of the support core also is tapered from a relatively thicker central longitudinal portion to relatively thinner side portions that are connected to the sidewalls, wherein a plurality of islands of the first molded structure are arranged along a longitudinal axis of both the top and bottom surfaces of the core in spaced relation relative to the sidewalls with the islands on the top surface being positioned in vertical alignment with the islands on the bottom surface.

6. The molded article of claim 1, wherein the first molded structure has a tapered end opposite the working end, and the second molded structure extends from the top surface to the bottom surface covering the tapered end, with the sidewalls adjacent the tapered end including angled end portions.

7. The molded article of claim 2, wherein the exposed surface of the islands has a circular, oval, polygonal or diamond perimeter and the side(s) have the same perimeter as the exposed surface or a different perimeter, optionally with the islands collectively forming a pattern or writing.

8. The molded article of claim 2, wherein the islands have one or more angled side(s), the exposed surface of the islands has a circular, oval, polygonal or diamond perimeter, and the first molded structure and the second molded structure are of different colors such that the color of the exposed surfaces of the islands contrast with the color of the second molded structure.

9. A molded article comprising:
a first molded structure that includes a working end and a longitudinal support core extending away from the working end, the core including top and bottom surfaces and opposed sidewalls located at least along the length of the longitudinal support core;
wherein the sidewalls of the first molded plastic structure have a height that extends above the top surface of the longitudinal support core, and a second molded structure is present upon at least the top surface of the longitudinal support core of the first molded structure between and coincident substantially with the height of the sidewalls forming with the support core a handle for the molded article, and
wherein the first molded structure further comprises a transition structure that contrasts with the second molded structure and is located in between and connected to the working end and core with the transition structure including one or more openings therein, and wherein the second molded structure extends into and fills the one or more openings of the transition structure.

10. The molded article of claim 1, wherein the first molded structure includes a hole in the core or between the core and the sidewall to facilitate formation of the second molded structure and optionally includes a transition structure that is located in between and connected to the working end and core, and sidewalls that extend from the transition structure and form the periphery of the handle of the article.

11. The molded article of claim 1, wherein the first and second shot molded structures are of contrasting colors.

12. A molded spoon or fork article comprising:
a first molded structure that includes a working end, a longitudinal support core extending away from the working end, the core including top and bottom surfaces, and a plurality of islands located on the core in a predetermined alignment to provide stabilizing support to facilitate molding of a second molded structure upon the first molded structure, wherein the islands are configured on one side of the first molded structure to provide support to the core to resist bending or deflection during introduction of material for forming the second molded structure; and
a second molded structure present upon at least one surface of the longitudinal support core and forming with the core a handle for the article,
wherein the first molded structure includes one or more sidewalls that form the periphery of the handle of the article on the side of the core that includes the islands, and wherein the support core is tapered from a relatively thicker central longitudinal portion to relatively thinner side portions that are connected to the sidewalls, and
wherein the sidewalls of the first molded plastic structure have a height that extends above the surface of the longitudinal support core on the side of the core that includes the islands, with the islands having a height that is greater than that of the sidewalls, and the second molded structure is located between and coincident substantially with the height of the sidewalls so that the islands have exposed surfaces that are not covered by the second molded structure.

13. The molded article of claim 12, wherein both the top and bottom surfaces of the core comprise the sidewall(s) and the one or more islands, with the islands being positioned in a predetermined alignment, and wherein one or more holes are provided in the core or between the core and the sidewall(s) to facilitate formation of the second molded structure on both the top and bottom surfaces of the core.

14. The molded article of claim 12, wherein a plurality of islands of the first molded structure are arranged along a longitudinal axis of both the top and bottom surfaces of the core with the islands on the top surface being positioned in vertical alignment with the islands on the bottom surface, with each island having an exposed surface and one or more sides, wherein the second molded structure covers the side(s) but not the exposed surfaces of the islands.

15. The molded article of claim 12, wherein the islands have an exposed surface, a circular, oval, polygonal or diamond perimeter and side(s) having the same perimeter as the exposed surface or a different perimeter, optionally with the islands collectively forming a pattern or writing.

16. The molded article of claim 12, wherein the islands have one or more angled side(s), the exposed surface of the islands has a circular, oval, polygonal or diamond perimeter, and the first molded structure and the second molded structure are of different colors such that the color of the exposed surfaces of the islands contrast with the color of the second molded structure.

17. The molded article of claim 12, wherein the first molded structure further comprises a transition structure that is located in between and connected to the working end and core with the transition structure including one or more openings therein, and wherein the second molded structure extends into and fills the one or more openings.

18. The molded article of claim 13, wherein the one or more sidewalls extend at least along the length of the handle from the working end and have a height that extends both above and below the surfaces of the core but not above the upper surfaces of the islands.

19. The molded article of claim 12, wherein the working end includes a tool selected from the group consisting of a spoon, fork, knife, toothbrush, paint brush and razor and the first and second shot molded structures are of contrasting colors.

20. The molded article of claim 12, wherein the sidewalls form the periphery of the handle and extend below the lower surface of core, the islands have one or more sides and are located on the lower surface of the core, wherein the side(s) of the islands and of the sidewalls that face the islands each have a zero degree draft.

21. The molded article of claim 3 wherein the sides of the islands on the lower surface of the core, and the sides of the sidewall on the lower surface of the core that face the islands each have a zero degree draft.

* * * * *